United States Patent [19]

Kirkpatrick et al.

[11] 4,275,021
[45] Jun. 23, 1981

[54] GAS-LIQUID CONTACTING TRAY WITH IMPROVED INLET BUBBLING MEANS

[75] Inventors: Robert D. Kirkpatrick, Tonawanda; David W. Weiler, Burt, both of N.Y.

[73] Assignee: Union Carbide Corporation, New York, N.Y.

[21] Appl. No.: 778,797

[22] Filed: Mar. 17, 1977

[51] Int. Cl.³ .............................................. B01F 3/04
[52] U.S. Cl. ........................... 261/114 JP; 202/158; 261/110; 261/114 R
[58] Field of Search ............ 261/110, 97, 113, 114 R, 261/114 A, 114 JP, 114 VT, 122, 124, DIG. 26; 202/158

[56] References Cited

U.S. PATENT DOCUMENTS

| | | | |
|---|---|---|---|
| 2,693,949 | 11/1954 | Huggins | 261/114 R |
| 2,767,966 | 10/1956 | Chave | 261/113 |
| 3,156,746 | 11/1964 | Kittel | 261/114 R |
| 3,282,576 | 11/1966 | Bruckert et al. | 261/114 JP |
| 3,338,566 | 8/1967 | Kittel | 261/113 |
| 3,550,916 | 12/1970 | Hoppe et al. | 261/114 R |
| 3,658,306 | 4/1972 | Jones | 261/114 R |
| 3,700,216 | 10/1972 | Uitti et al. | 261/114 R |
| 3,729,179 | 4/1973 | Keller | 261/114 A X |
| 3,759,498 | 9/1973 | Matsch | 261/114 JP |

FOREIGN PATENT DOCUMENTS 510247  5/1976  U.S.S.R. .............................. 261/114 JP

Primary Examiner—Richard L. Chiesa
Attorney, Agent, or Firm—J. C. LeFever; S. J. Hultquist; A. H. Fritschler

[57] ABSTRACT

A gas-liquid contacting tray of the crossflow type with improved means for initiating bubbling activity at the tray inlet region comprising spaced-apart imperforate wall members extending substantially vertically upwardly and transverse to the liquid flow path, contiguously associated and coextensive at their upper edges with an intermediate perforated wall member horizontally extending therebetween.

2 Claims, 8 Drawing Figures

GAS-LIQUID CONTACTING TRAY WITH IMPROVED INLET BUBBLING MEANS

BACKGROUND OF THE INVENTION

1. Field of the Invention

This invention relates in general to an improved gas-liquid contacting tray of the type used in distillation and absorption systems for mass transfer between two fluids, and more particularly to improved means for promoting complete tray activity over the entire tray surface.

2. Description of the Prior Art

In the art of mass transfer for selectively separating at least one component from a mixture of at least two constituents as for example in distillation and absorption applications, an upwardly flowing vapor or gas stream is typically contacted on a substantially horizontally aligned contacting surface with a generally downwardly flowing liquid stream. In a conventional distillation process, such contacting permits the upwardly flowing vapor or gas stream to become selectively enriched with the lighter components of the mixture, i.e., those components with relatively high volatilities, while the generally downwardly flowing liquid stream becomes selectively enriched with the heavier component of relatively low volatilities.

A variety of types of gas-liquid contacting trays have been conventionally employed in the above described mass transfer operations, to effect intimate contacting between the respective gas and liquid phases. The degree of mass transfer of a given component between these phases is determined largely by the intimacy of this contact. Maximum utilization of the gas-liquid contacting tray requires a close approach to phase equilibrium at all points on the tray, but this condition is difficult to achieve in many instances with trays of the prior art.

A major factor which has prevented reasonable approaches to phase equilibrium has been the existence of partial inactivity on the gas-liquid contacting surface whereby the process vapor fails to pass through the prior art tray and the liquid thereupon at all points uniformly. Under such conditions, a substantial portion of the contacting surface merely transports clear liquid and does not contribute to the mass transfer process. Furthermore, such inactive areas are prone to weep or drain liquid onto the tray below thereby altering liquid-vapor ratios on one tray and upsetting fluid composition on the next tray.

Partial inactivity occurs on a given tray when the tray and its liquid present nonuniform resistance to vapor flow entering the tray. A common cause is the hydrostatic gradient which normally comprises the driving force for moving liquid across the tray. Inactivity can be reduced significantly by eliminating this gradient, for example, by employment of vapor thrust, rather than gravity, to propel the liquid. Vapor thrust for this purpose may be generated by inclined openings properly arranged to move the liquid at desired velocity and in a desired direction, as is well known to those skilled in the art.

Despite the elimination of gradient and other improvements of the hydraulic behavior of the gas-liquid contact-tray, it is well known that a certain area, notably the liquid inlet area of the tray, exhibits chronic inactivity, particularly in large diameter trays operating with a low vapor pressure drop across the tray.

The prior art has attempted to overcome the inlet inactivity problem on gas-liquid contacting trays by means of various types of devices, commonly referred to as "bubble promoters," disposed at the inlet region of the liquid flow path across the tray surface to positively initiate bubbling activity. Such bubble promoter devices generally operate by increasing momentarily the velocity of the liquid at the tray inlet region, and thereby reducing its hydrostatic head. Bubbling is initiated immediately at the tray threshold and, once initiated, continues across the tray surface.

One type of inlet bubbling promoter means employed in prior art trays is disclosed in U.S. Pat. No. 3,282,576 to W. Bruckert et al. The Bruckert promoter comprises an upwardly and inwardly extending imperforate wall integral with the imperforate liquid receiving pan of the tray, and a downwardly and inwardly sloped perforated wall connected at one end to the top edge of the upwardly extending imperforate wall and at its other end to the gas-liquid contacting member or tray deck. Liquid introduced from a previous tray by downcomer means impinges on the imperforate receiving pan and passes over the upwardly extending wall and thereafter flows downwardly to the tray deck over the inwardly sloped surface. Inlet bubbling is achieved by the reduction in the hydrostatic liquid head on the downwardly sloped surface relative to the remainder of the tray surface. This bubble promotion device thus has an active bubbling surface which is constructed as a descending ramp and, expectedly, liquid flowing down the ramp surface experiences a gravitational acceleration. This acceleration increases the liquid's entrance velocity as it enters onto the tray deck, a condition which in some instances may be detrimental to hydraulic behavior of the tray, giving rise to liquid maldistribution on the gas-liquid contacting surface.

Another type of bubbling promoter is disclosed in the prior art which relies on a somewhat different phenomenon to reduce the liquid's resistance to gas flow at the tray inlet region. This promoter comprises a vertically extending wall member which separates the imperforate liquid receiving pan from the active gas-liquid contacting surface, with a perforated plate member connected to the vertically extending wall member at its upper end, so that the perforated member extends laterally and inwardly from the liquid inlet region, above a portion of the gas-liquid contacting surface. Liquid introduced from a previous tray via downcomer means impinges on the imperforate receiving pan and then flows over the vertical wall member, across the perforated plate member and drops onto the tray deck. Experimental testing has shown that the major portion of inlet bubbling resulting from the use of this bubble promoter is provided by gas which passes through the tray deck under the horizontally extending perforated plate member and exits through the space between the downstream edge of the horizontally extending perforated plate member and the tray deck, while only an insignificant portion of the bubbling is provided by gas passing in series through the tray deck and through the perforated plate member of the promoter. By initiating bubbling in this fashion, not only is the liquid discharged from the downstream edge of the perforated plate excessively aerated but this liquid is also thrown across the tray deck by the gas issuing from the aforementioned space between the tray deck and the perforated plate member downstream edge.

Still another bubble promotion device which has been employed by the prior art comprises an upwardly and inwardly slanted imperforate plate which separates the imperforate liquid receiving pan of the tray from the active tray deck thereof, with a vertically extending wall member connected to the active tray deck below the downstream edge of the slanted plate, terminating at its upward extent just below the downstream edge of the slanted plate. This construction forms a continuous slot opening across the tray inlet which is in gas flow communication with the vapor space of the next lower tray. Liquid discharged from the previous tray in the distillation column flows via downcomer means to the imperforate receiving pan of the tray, flows upwardly along the slanted plate and falls from the downstream edge of the slanted plate onto the tray deck. The flowing liquid is contacted with the upwardly flowing gas stream which issues through the slot opening of the bubble promoter to produce a gas-liquid biphase. Published test results show that the gas-liquid froth profile across the tray which is achieved by this upwardly slanted plate bubble promoter is similar to that achieved on the previously-described horizontal perforated plate bubble promoter, indicating that the same inlet bubbling activation phenomenon, together with the associated disadvantages of excessive aeration at the tray inlet and "throw" of liquid downstream across the tray deck, are present in both cases.

The operation of the above-described prior art bubble promoters, as indicated, involves a propulsion of the liquid onto and across the gas-liquid contacting surface, or active tray deck. While such liquid propulsion may favorably reduce the hydraulic gradient on many gas-liquid contacting trays of the cross flow sieve type, this propulsion on trays utilizing vapor directing orifices is generally disadvantageous. Sieve trays are gas-liquid contacting trays employing a more or less uniform pattern of fixed size perforation openings with walls normal to the tray surface distributed over the gas-liquid contacting surface. It is well established that the performance of sieve trays may be improved by the employment of vapor directing orifices, as for example of a type disclosed and claimed in U.S. Pat. No. 3,417,975 to B. Williams et al., on the gas-liquid contacting surface. Trays designed in accordance with the Williams et al patent (hereinafter referred to as slotted sieve trays) perform with improved efficiency owing to the elimination of longitudinal hydraulic gradient in the liquid flowing across the tray. In such slotted sieve trays, the use of the afore described prior art bubble promotion devices tends to yield acceleration of the liquid across the tray contacting surface. This acceleration of the liquid limits the overall mass transfer efficiency which is achievable by the tray, by significantly reducing the residence time of the accelerated liquid on the tray, particularly at the centerline region thereof.

Another problem associated with the above-described prior art bubble promoters is their tendency to produce spraying in the inlet region of the tray. Such spraying is vastly different from the desired normal condition of high gas-liquid froth height on the tray surface. The desired froth comprises bubbles of gas more or less homogeniously interspersed in matrix of liquid, whereas a spray comprises discreet drops of liquid dispersed in the gas space above the tray surface. A high froth height on the tray surface is generally associated with a high tray contacting efficiency, assuming that the froth height is also uniform over the entire tray contacting surface, while a high spray height is generally detrimental to tray performance and is associated with poor tray contacting efficiency. The poor contacting efficiency associated with the spray can be partially attributed to the change in the nature of the gas-liquid contact from the efficient liquid phase continuous regime characterizing a froth to the inefficient gas phase continuous regime characterizing a spray. Additional inefficiency results from the excessive aeration of liquid in the spray region, yielding a disproportionate amount of flow through in this area of the tray relative to the more normally behaving regions of the tray. An important consequence of spraying above the gas-liquid contacting surface of the tray is the resultant tendency toward entrainment of the liquid in the gas passed upwardly through the distillation column. Such entrainment is severely detrimental to overall process efficiency and may lead to premature flooding of the column. Under such conditions, flooding can only be avoided by the comparatively expensive remedy of increasing the tray spacing in the column. High levels of entrainment caused by excessive spraying results in further reduced tray efficiency by virtue of recycling of a portion of the already distilled liquid from a given tray back to the gas-liquid contacting zone associated with the previous tray, where the degree of separation is reduced substantially different.

In view of the foregoing deficiencies of the respective prior art bubble promoting devices, one of ordinary skill might reasonably propose to avoid the gravitational acceleration of liquid as associated with the Bruckert bubbling promoter, and to avoid the high liquid propulsion and spray levels associated with the upwardly slanted plate bubble promoter, by various structural modifications of the horizontally extending perforated plate member 66 promoter. To reduce the inlet spraying level associated with the horizontal perforated plate bubble promoter, for example, one may propose to reduce the number of perforations per unit area in the horizontal plate to a comparatively low level. Separately, or in conjunction with this change, it may also be proposed to reduce the length of the perforated plate in the horizontal direction to lower the level of inlet spraying as well as decreasing acceleration of the liquid across the tray. It may further be proposed to reduce the height or elevation of the perforated plate to reduce the level of inlet spraying and liquid acceleration. However, none of these changes, either alone or in combination, are able to reduce liquid propulsion to an acceptable level, although some reduction in inlet spraying may be achieved.

Accordingly, it is an object of the present invention to provide a gas-liquid contacting tray with improved inlet bubbling means.

It is another object of the invention to provide a tray with bubbling means which adequately initiates inlet activity while substantially eliminating any liquid acceleration effect and inlet spraying, so that a uniform froth height is provided over the entire tray surface.

Other objects and advantages of this invention will be apparent from the ensuing disclosure and appended claims.

SUMMARY OF THE INVENTION

This invention relates to an improved gas-liquid contacting tray of the type used in distillation and absorption systems for mass transfer between the two fluids.

The invention relates more particularly to a gas-liquid contacting tray for use in a distillation column to effect intimate contact between rising vapor and liquid flowing along a path across the gas-liquid contacting member of the tray from a liquid inlet adjacent one edge of the contacting member to a liquid discharge adjacent an opposite edge thereof. The liquid inlet includes a substantially horizontally aligned imperforate inlet surface for receiving liquid in liquid flow communication with said contacting member and a downcomer member adapted to be positioned substantially parallel to the distillation column inner wall, spaced above and coextensive with the inlet surface so as to form an exit path beneath the lower end of the downcomer member for introducing liquid to the inlet surface.

The improvement of the invention comprises: (a) a first imperforate wall member contiguously associated and coextensive with an edge of the inlet surface transverse to the liquid flow path and extending substantially vertically upwardly from such edge to a substantially uniform height; (b) an intermediate wall member with main flat top and bottom surfaces contiguously associated and coextensive with the upper edge of the first wall member extending horizontally therefrom in the direction of the liquid discharge to a substantially uniform extent, with a plurality of fixed size openings uniformly distributed across the intermediate wall member and extending therethrough with walls normal to the main flat top and bottom surfaces for gas flow, to initiate bubbling in liquid flowing across the intermediate wall member from the inlet surface over the first imperforate wall member; and (c) a second imperforate wall member contiguous associated and coextensive at its upper edge with the downstream edge of the intermediate wall member and extending substantially vertically downwardly therefrom and contiguously associated and coextensive at its lower edge with the aforementioned one edge of the contacting member, whereby liquid which has been flowed across the intermediate member and in which bubbling has been initiated is introduced to the gas-liquid contacting member for flow thereacross to the liquid discharge.

As used herein, the terms "bubbling liquid," "foam" "froth" and "active liquid" refer to a liquid through which a gas or vapor is being passed. The term "clear liquid" as used herein refers to a single phase liquid fluid without substantial physical admixture with process vapor. Clear liquid is not restricted to liquids having optical clarity, but includes liquids rendered cloudy or opaque by dispersion of substances therein other than process vapor as well as those liquids which are naturally cloudy or opaque. The term "active area" refers to that portion of a tray surface which is perforated or apertured for vapor flow, exclusive of that portion illustrated and discussed hereinafter as the bubble promoter area.

As used herein, the term "tray diametral streamline" means the straight line liquid flow path from the tray liquid inlet to tray discharge, parallel to and approximately adjacent to the column diameter. Flow along the diametral streamline of the tray is remote from the cylindrical wall enclosing the installed tray in service, and is not appreciably deflected as a result of the diverging or converging character of the liquid flow on the tray contacting member top surface. The term "tray transverse center line" means a line on the tray contacting member top surface which is perpendicular to the tray diametral streamline at the maximum transverse extent of the tray contacting member. The expression "slot angle" refers to the included angle between the slot vector for a given slot and the tray diametral streamline. The vector of a slot is defined as a horizontal line normal to the width of the slot opening.

The bubble promoter of the present invention has been found to provide a substantial and unexpected reduction in inlet spraying and liquid acceleration relative to the bubble promoter devices of the prior art, as will be shown more fully hereinafter. In operation, the bubble promoter of the present invention reduces the hydrostatic head of liquid at the inlet region of the contacting tray relative to the remainder of the tray surface. Such reduction in hydrostatic head permits utilization of the phenomenon commonly referred to as "dynamic enhancement," which is a condition of induced activity extending over the contacting surface of the tray downstream from the liquid inlet thereof, as associated with a uniform and smooth flow or spread of low density froth from the tray inlet across the tray portions downstream thereof. Due to the virtual elimination of inlet liquid acceleration which is normally present in operation of the devices of the prior art, a tray constructed in accordance with the present invention exhibits highly uniform liquid residence times across all portions of the liquid flow path across the tray and improved mass transfer efficiency relative to trays employing the bubble promoter devices of the prior art.

DESCRIPTION OF THE PREFERRED EMBODIMENTS

Figure 1:
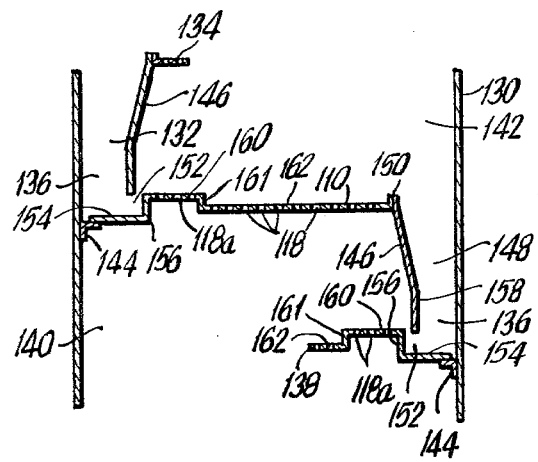
FIG. 1 is a view in cross sectional elevation of a sieve tray utilizing inlet bubbling means according to one embodiment of the invention.

Referring to FIG. 1, there is shown a conventional fractionating column or tower 130 having a plurality of perforated or sieve type liquid-gas contacting trays therein and arranged one over the other. One such tray 110 is shown in its entirety. Also shown is a downcomer 132 of a tray 134, above a seal pan region 136 and a portion of a sieve tray 138 below. These trays define a plurality of vertically spaced liquid-gas contact stages 140 and 142 through which vapors pass upwardly in the tower 130. Each of the trays 110, 134 and 138 is supported and secured to the walls of column 130 by tray holder 144. All of the trays within the column 130 will have the same general features of construction, and though the discussion hereinafter will be directed more specifically to tray 110, it will be clear that is it equally applicable throughout the column. Extending below tray 110 is a downcomer element 146 which, in cooperation with the side wall of column 130 forms a downcomer 148 for the passage of liquid downwardly from the liquid discharge end 150 of contact tray 110 to the liquid inlet region 152 of tray 138. Adjacent to the lower portions of downcomer 132 and 148 are seal pan regions 136 having basins 154 constituting substantially horizontally aligned imperforate inlet surfaces for receiving liquid, which are in liquid flow communication with the contacting member of the tray, and the first imperforate wall member 156. The vertical, tray-side portions of downcomer elements 146, 158 and first wall members 156 of seal pan regions 136 bound the liquid inlet region 152 associated with liquid inlet surfaces 154. In this illustrative arrangement, the downcomer member 146 is adapted to be positioned substantially parallel to the distillation column inner wall, spaced above and coextensive with the inlet surface 154 so as to form an exit path beneath the lower end of the downcomer member for introducing liquid to the inlet surface 154.

The first imperforate wall member 156 is contiguously associated and coextensive with an edge of the inlet surface 154 transverse to the liquid flow path and extends substantially vertically upwardly from such edge to a substantially uniform height, as shown. As used in this context, the liquid flow path is the straight line flow path of liquid from the tray inlet to the tray liquid discharge across the gas-liquid contacting member of the tray. The intermediate wall member 160 with main flat top and bottom surfaces is contiguously associated and coextensive with the upper edge of the first wall member 156 and extends horizontally therefrom in the direction of the liquid discharge 148 to a substantially uniform extent. A plurality of fixed size openings 118a are uniformly distributed across the intermediate wall member 160 and extend therethrough with walls normal to the main flat top and bottom surfaces for gas flow, to initiate bubbling in liquid flowing across the intermediate wall member from the inlet surface 154 over the first imperforate wall member 156. A second imperforate wall member 161 is contiguously associated and coextensive at its upper edge with the downstream edge of the intermediate wall member 160 and extends substantially vertically downwardly therefrom and is contiguously associated and coextensive at its lower edge with the upstream edge of contacting member 162, whereby a liquid which has been flowed across the intermediate wall member 160 and in which bubbling has been initiated is introduced to the gas-liquid contacting member 162 for flow thereacross to the liquid discharge 148.

In operation, clear process liquid descending from the overlying tray 134 is directed by downcomer element 146 into downcomer 132 and onto the base liquid inlet surface 154 of seal pan region 136. The liquid thereupon ascends along first wall member 156 in the liquid approach region 152. When the clear liquid reaches the top of the first wall member 156 and exits from liquid approach region 152, the liquid traverses the intermediate wall member 160 and flows onto the gas-liquid contacting surface 162, as described. In flowing over the intermediate wall member 160, the liquid flows over perforations 118a which have process vapor passing therethrough. The clear liquid flowing over the bubble promoter presents to the rising process vapor an artificial head of liquid on the intermediate wall member which is lower than the head of liquid which is on the contacting surface of tray member 162. As a result of this artificial head, which manifests itself as a reduced pressure region, the clear liquid emerging from the liquid approach region 152 is immediately transformed into an active liquid or froth. Vapor flowing through the liquid in this region thereby makes the inlet portion of the tray completely active. As a result of the clear liquid emerging from 152 being made active, dynamic enhancement carries and sustains this activity over the tray gas-liquid contacting surface thereby rendering the entire tray surface active.

Figure 2:
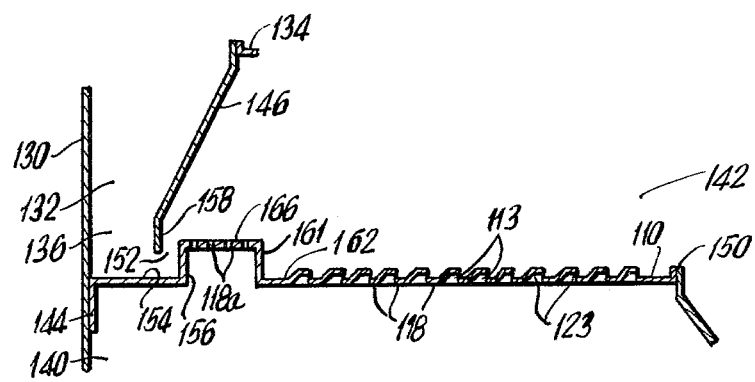
FIG. 2 is a cross-sectional elevation view of a slotted sieve tray utilizing inlet bubbling means according to the present invention.

Percent free area in the form of perforation in the intermediate wall member of the bubble promoter will vary considerably, depending upon the physical properties of the liquids and vapors of any liquid-vapor contacting operation. The percent free area, however, should not be so great as to cause weeping of tray liquid through the perforations at reasonable liquid and vapor loadings. In practice, it is preferable to "match" the perforated area of the bubble promoter intermediate wall member to the perforated area of the contacting member 162, i.e., the percent free, or open, area of the bubble promoter intermediate wall member is approximately of the same magnitude relative to the open area of the contacting member. For bubble promoters according to the present invention used in conjunction with perforated trays having vapor thrust openings in addition to fixed size perforations, such as is shown in FIG. 2, the intermediate wall member should be perforated to a fractional open area of from 20 to 125% of the fractional open area of the liquid-gas contact member as based on the perforation and vapor-thrust openings of the contacting member; preferably fractional open area of the intermediate wall mbmer is 35 to 100% of the fractional open area of the liquid-gas contact member. At fractional open area levels of less than 20% an inadequate amount of process vapor is passed into the liquid flowing over the intermediate wall member for bubble initiation. At fractional open areas of greater than 125%, an excessive amount of vapor is introduced into the liquid flowing over the intermediate wall member, with a resulting tendency toward spraying, such as is desirably avoided in operation for the reasons previously described.

In the broad practice of the present invention, a gas-liquid contacting tray should have an active area, as that term is defined earlier herein, of at least 60%. The reason for such constraint is that at active area levels below 60%, one or more of the liquid inlet surface, bubble promoter, and liquid discharge portions of the column cross section become disproportionately large relative to the actual gas-liquid contacting area provided. In connection with such considerations, the intermediate wall member of the bubble promoter should have a length as measured between the upstream and downstream edges thereof of from 0.5 to 12 inches. At intermediate wall member lengths of above 12 inches, too much active area of the tray is excluded, without corresponding improvement in hydraulic or efficiency behavior of the tray. At intermediate wall member lengths of less than one-half inches, there is not an adequate flow path length efficient bubbling initiation, such as is characteristic of lengths in the range of from 0.5 to 12 inches. Under these considerations, a preferred length of the intermediate wall member is from 4 to 6 inches. In the preferred practice of the invention, the second imperforate wall member has a height of between 0.5 and 4.0 inches. The first wall member can be of greater vertical extent than the second wall member if the design incorporates a recessed receiving pan, as shown in FIG. 1. At height values less than 0.5 inches, there tends to be an excessive head of liquid provided on the intermediate wall member top surface, with a resulting tendency toward weeping. At height values above about 4.0 inches, the reverse is true. At such values, there tends to be an inadequate liquid head on the intermediate wall member of the bubble promoter relative to the liquid head on other regions of the tray surface, with resultant tendency toward spraying, gas bypassing, and inadequate bubbling in the liquid subsequently introduced to the tray's gas-liquid contacting surface.

Referring now to FIG. 2, there is shown a conventional fractionating column or tower 130 having a plurality of perforated or sieve type liquid-gas contacting trays having vapor thrust openings 113 or slots from which process vapor flowing therethrough contacts a process liquid flowing across the tray surface thereby causing the liquid to flow across the tray without the aid of liquid gradients. The thrust openings 113 may suitably be arranged in parallel rows on the tray surface and generally face away from the liquid inlet of the tray, and are formed by the cooperation of vapor flow directing surface 123 with the surface of the contacting member 162. The tray elements in FIG. 2 similar to those previously discussed in connection with FIG. 1 will be given the same numerical designation as in the latter figure, in the interest of clarity. Liquid-vapor contact trays, represented by tray 110, are arranged in column or tower 130, one over the other such that the trays within column 130 form vapor liquid contact stages represented by 140 and 142. Each tray is equipped with a downcomer element 146 which cooperates with the walls of column 130 to form a downcomer represented by 132. Each tray is secured to the column wall by tray holder 144. All of the trays within column 130 will have the same general features of construction as that shown by tray 110. Extending below tray 134, located above tray 110, is downcomer element 146 which, as previously mentioned, forms downcomer 132 for the passage of liquid downwardly from the tray above 134 to the liquid approach region 152 of tray 110. Adjacent to the lower portion of downcomer 132 is seal pan region 136 having base liquid inlet surface 154 and the first wall member 156. The vertical, tray-side portion 158 of downcomer element 146 forms with the liquid inlet surface 154 and first wall member 156 a liquid approach region 152. Joined to the upper edge of first wall member 156 is the intermediate wall member 160 which extends horizontally and is joined at its downstream edge with the upper edge of second wall member 161 which in turn depends vertically downwardly and is joined at its lower most edge with the upstream edge of the gas-liquid contacting member 162. The intermediate wall member 160 has flat main top and bottom surfaces and, in practice, may be integral with or attached by some suitable means to the spaced apart first and second wall members 156 and 161. The intermediate wall member 160 has perforations 118a defined by walls which are substantially normal to the main flat top and bottom surfaces of the intermediate wall member. It should be noted that the intermediate wall member 160 is not equipped with vapor thrust openings 113 as is the gas-liquid contacting member 162.

Process liquid descending from the overlying tray 134 is directed by downcomer element 146 in the downcomer 132 and onto the base liquid inlet surface 154 of seal pan region 136. The liquid thereupon ascends along the substantially vertically upwardly extending first wall member 156, at the liquid approach region 152. When the liquid reaches the top of the first wall member 156, thereby exiting from the liquid approach region 152, the liquid flows across the intermediate wall member 160 having perforation openings 118a therein and thence downwardly from the downstream edge of the intermediate wall member onto the gas-liquid contact member 162. The liquid flowing across the intermediate wall member 160 presents to the rising process vapor passing through perforation openings 118a an artificial head of liquid lower than that which is on the contacting member 62 of tray 110. As a result of this artificial head, the clear liquid emerging from liquid approach region 152 is immediately transformed into an active liquid or froth as a result of the reduced head of liquid and vapor flowing therethrough, thereby making this portion of the tray completely active. As a result of the clear liquid from region 152 being made active, the activity is swept across the tray gas-liquid contacting surface thereby rendering the entire tray surface active.

Figure 3:
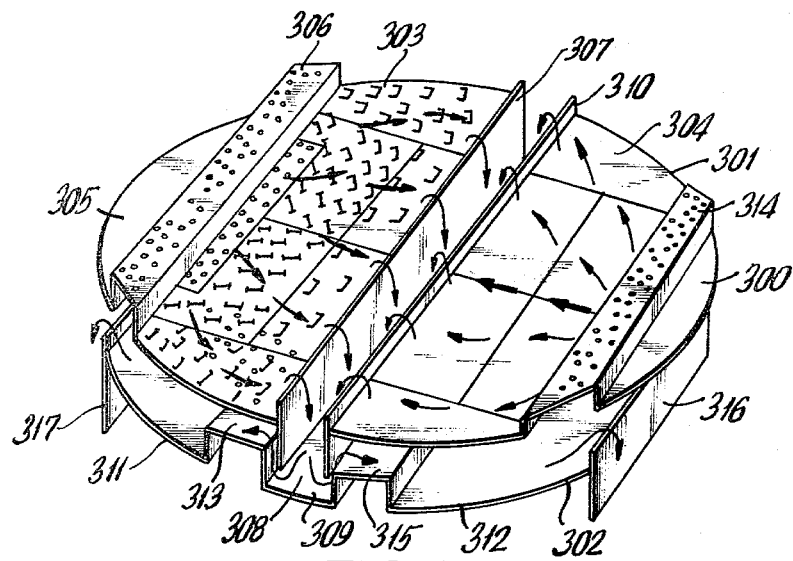
FIG. 3 is an isometric view looking downwardly on a assembly of slotted sieve trays constructed in accordance with the present invention, of the double-pass, side-to-center and center-to-side flow type.

FIG. 3 is an isometric view looking downwardly on an assembly of slotted sieve trays including an upper tray of the double pass, side-to-center flow type and the lower tray of the double pass, center-to-side flow type. The column walls have been omitted from the figure but it is to be understood that the circular edges of the trays are sealed substantially tightly against the vertical wall of the cylindrical column enclosing the trays. The trays are each of the two-pass type wherein liquid flowing downwardly through the column flows across the tray member main flat top surfaces in two discreet liquid streams. The liquid flows across the tray gas-liquid contacting member of the upper tray from a liquid inlet at one edge of the tray contacting member along a liquid flow path on the main surface including a diverging flow section adjacent to the inlet to a liquid discharge at an opposite edge of the tray contacting member extending transversely from edge to edge of the tray along the tray transverse center line. From the liquid discharge of the tray transverse center line of the upper tray in the assembly illustrated, the discharged liquid is passed by downcomer means to the underlying tray, which is of the center-to-side flow variety. In the latter tray the liquid inlet is disposed adjacent to the tray transverse center line so that liquid introduced to the tray contacting member main flat top surface flows thereacross from the liquid inlet to a liquid discharge at the periphery of the tray adjacent the column wall as shown. In this manner, on alternate trays, the liquid streams flow either toward each other or away from each other.

More specifically, contacting tray 301 is divided into half tray 303 on which liquid flows forward and to the right in the Figure as drawn and half tray 304 on which liquid flows from right to left as drawn. One-half of the liquid stream flowing down the column enters half tray 303 from a downcomer at liquid inlet 305 and thereafter flows across the bubbling promoter 306. Bubbling promoter 306 is constructed in a manner substantially similar to that shown in FIGS. 1 and 2 herein. The foam or froth created at promoter 306 flows across the main flat top surface of the slotted and perforated tray contacting member and is discharged from the tray by discharge means comprising outlet weir 307 and downcomer 308. Upon entry into the downcomer 308 entrapped vapor in the discharged liquid disengages from the liquid and combines with the major gas stream, continuing upward to the next tray above. The vapor-disengaged substantially clear liquid flows through the downcomer 308 to the downcomer receiving pan 309. The liquid flows under the outlet wall 307 of half-tray 303 onto the underlying half tray 311. The outlet wall 307 of half-tray 303 descends into the downcomer 308 to a sufficient depth such that vapor by-pass up through the downcomer is prevented. The liquid flowing onto half-tray 311 flows successively over the bubble promoter 313 and across the main flat top surface of the associated tray contacting member.

While one-half of the column liquid is flowing over half-tray 303, the other half of the column liquid is flowing over the half-tray 304. The latter liquid flows successively over bubble promoter 314 and the main flat top surface of tray contacting member of the half tray 304. After traversing the main flat top surface gas-liquid contacting zone, the liquid overflows weir 310, passes into downcomer 308 and drops to the level of tray 302 onto receivpan liquid inlet surface 309. It then flows successively over bubble promoter 315, the main flat surface of the associated tray contacting member of half-tray 312 and finally over the outlet weir 316 of that half-tray. As against this crosswise generally horizontal flow of liquid on the main tray surfaces, the column vapor flows substantially upwardly from tray to tray through the contacting column. This vapor is prevented from bypassing through the respective downcomers of the column by the outlet walls 307, 310, 316 and 317.

In the tray embodiment shown in FIG. 3, the tray contacting member of the upper tray 301 is divided into three band portions having different slotting configurations, which can be quantatively differentiated by the slotting angle provided in each band portion. The purpose of such slotting and band configuration is to correct deviations from plug flow on the gas-liquid contacting member of the sieve tray by providing a modified pattern of slots characterized by high angles with respect to the diametral streamline of the tray at the inlet section of the tray member. Such slotting pattern may advantageously be used in conjunction with the practice of the present invention, as will be described more fully hereinafter, and is described more fully in our U.S. patent application Ser. No. 772,941 filed Feb. 28, 1977.

Figure 4:
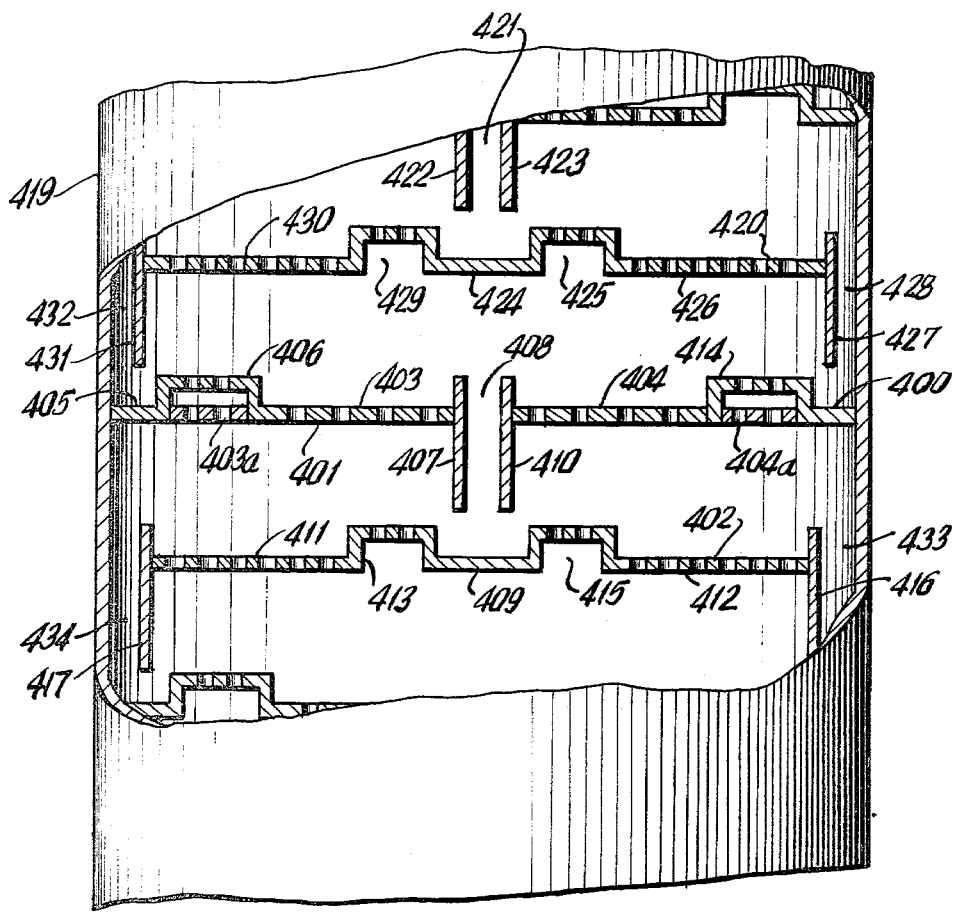
FIG. 4 is a cross sectional, elevational view of a portion of a distillation column featuring two-pass sieve trays constructed in accordance with the present invention.

Referring to FIG. 4, there is shown a gas-liquid contacting column or tower 419 having a plurality of sieve type contacting trays 420, 401 and 402 spaced vertically apart from one another. The trays are of the two-pass type whereby the liquid flowing in the column is divided in two streams, each of which alternatively flows from column side to column center and from column center to column side, hereinafter referred to as center downcomer trays and side-downcomer trays, respectively. Three complete trays are illustrated in the figure, the uppermost tray 420 and lowermost tray 402 being of the side downcomer type, while the middle tray 401 is of the center downcomer type. In the column as shown liquid from the upper most, partially obscured tray flows downwardly through the downcomer 421 defined by downcomer wall members 422 and 423 and flows onto the liquid inlet receiving surface 424. The liquid then divides into two streams with one stream flowing from left to right across the righthand portion of the tray, first flowing upwardly over the first imperforate wall member, across the horizontal intermediate wall member and downwardly over the second imperforate wall member of the bubble promoter 425 thereafter flowing across the gas-liquid contacting member 426 to the liquid discharge comprising downcomer 428 defined by vertical wall member 427. In like manner, the other portion of the liquid flowing onto the liquid inlet surface 424 flows from right to left across the left hand portion of the tray 420, flowing sequentially over the bubble promoter 429, across gas-liquid contacting member 430 and finally through the downcomer 432 defined by vertical wall member 431. Thereafter the liquid adjacent to the column wall on the respective inlet surfaces 400 and 405 flows inwardly toward the center of the column over bubble promoters 414, 406 gas-liquid contacting members 404, 403 and passes through the downcomer 408 defined by vertical wall members 407 and 410 to the lowermost tray 402, on which the liquid flows from central liquid inlet surface 409 in two discrete streams over the bubble promoters 413, 415, gas-liquid contacting member 411, 412 and into discharge downcomers 433, 434 defined by vertical walls 416, 417, respectively. The middle tray 401 in this embodiment illustrates a modified bubble promoter construction which may advantageously be employed in the broad practice of the present invention, as for example, achieve the necessary pressure drop across the promoter without reduction in perforation density of the intermediate wall member or to facilitate assembly of the gas-liquid contacting tray. In this modification, perforated tray deck portions 403a and 404a underlie the previously described promoters 406 and 414, respectively.

Figure 5:
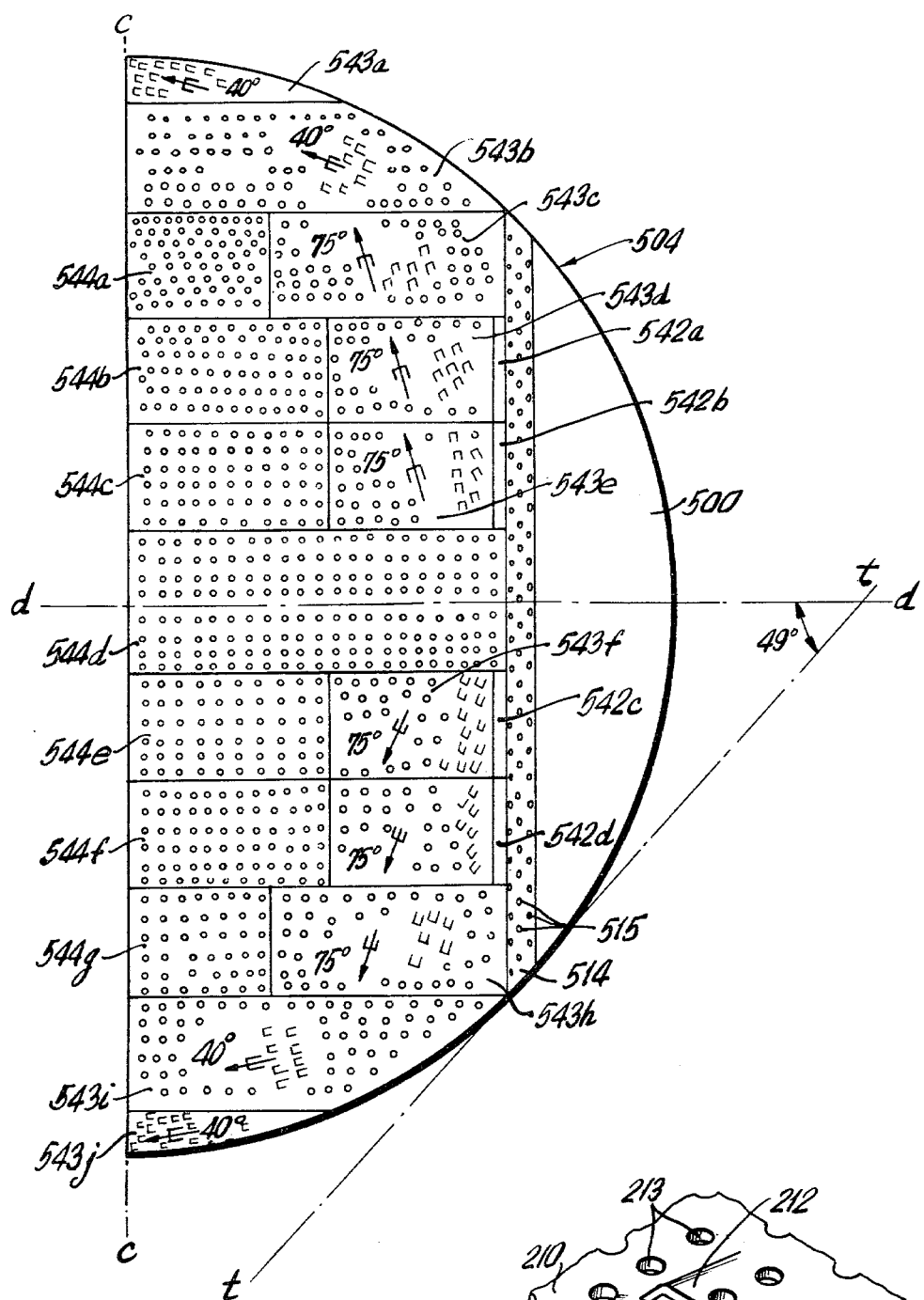
FIG. 5 is a plan view of one-half of another double-pass, side-to-center flow slotted sieve tray according to the invention.

FIG. 5 is a plan view of one-half of another double-pass, side-to-center flow slotted sieve tray constructed in accordance with the present invention. This tray 504 is of a type such as may be advantageously employed in the gas-liquid contacting structures shown in FIGS. 3 and 4 herein. The liquid inlet surface 500 for this half-tray suitably comprises and imperforate portion of the tray surface. The bubble promoter 514 having perforation openings 515 in the intermediate wall member surface thereof is contiguously associated with the liquid inlet surface 500 and serves the function of initiating bubbling in the introduced liquid and assures continuity of bubbling action across the main flat top surface of the tray. As shown, a transversely extending unslotted band portion comprising panels 542a, b, c and d, is disposed adjacent to the bubble promoter 514 at the upstream edge of the gas-liquid contacting member of the tray. This unslotted band portion serves to limit excessive inlet spraying, but may suitably be dispensed with in the event inlet spraying and liquid entrainment in the gas flow are nonexistent or insignificant. As mentioned earlier herein, the extent of inlet spraying on a tray constructed in accordance with the present invention is inherently low, but if present, may be virtually eliminated by the expedient of the unslotted band portion as shown.

As shown the gas-liquid contacting tray 504 has a gas-liquid contacting member which is divided into a multiplicity of band portions, characterized by substantially uniform open area configurations, with the respective band portions being further comprised of various panels, as described more fully hereinafter. The tray contacting member has main flat top and bottom surfaces on which liquid flows on the top surface thereof across the tray from a liquid inlet comprising liquid inlet surface 500 at one edge of the tray member along a liquid flow path on the main top surface including a diverging flow section adjacent to the inlet to a liquid discharge at an opposite edge of the tray contacting member extending transversely from edge to edge of the tray along the tray transverse center line c—c at the downstream edge of the tray contacting member. The liquid inlet surface 500 extends transversely and is parallelly oriented with respect to the liquid discharge. A plurality of fixed size perforation are distributed across the tray contacting member and extend therethrough with walls normal to the main flat top and bottom surfaces for gas flow therethrough. A plurality of elevated portions formed from the tray contacting member are provided across the surfaces each with an upper surface raised from the main flat top surface having a front leading edge separated from the main flat top surface to form an elongated slot opening therewith of greater width than height. The raised upper surface is inclined to the main flat top surface and has a back edge integral with such surface and each elevated portion is spaced from adjacent elevated portions by the main flat top surface entirely surrounding such elevated portions.

The gas-liquid contacting tray shown in FIG. 5 is of a type as disclosed more fully in our U.S. patent applications Ser. No. 772,941, incorporated herein to the extent pertinent. In this general type of contacting tray, the tray contacting member comprises a first band portion adjacent to the liquid inlet and extending therefrom downstream for distance of from 20% to 50% of the length of the tray diametral streamline from liquid inlet surface to the liquid discharge and extending transversely outwardly from the tray diametral streamline for distance at least 25% of the transverse length of the liquid inlet surface. The slot openings in the contacting member first band portion have an angular orientation with respect to and away from the tray diametral streamline such that the slot angle of the individual slots is greater than the angle formed by the diametral streamline d—d and a tangent line t—t at the contacting member outer edge at the point of intersection with the liquid inlet surface. The first band portion is bounded at each of its transverse outer extremities by adjacent second band portions of the contacting member each extending transversely to the contacting member outer edge and downstream to the liquid discharge. The second band portions have angular orientations of the slot openings therein with respect to and away from the tray diametral streamline such that the slot angle of individual slot is between 15° and 45°. The first band portion is bounded at its downstream extremity by an adjacent third band portion of the tray member extending transversely between the second band portions and downstream from the first band portion to the liquid discharge. The third band portion has lower slot density than the first and second band portions. In the broad practice of this tray configuration, the slot angle of individual slots in the contacting member first band portion are between 75° and 90°.

As previously indicated, the active gas-liquid contacting area of the tray shown in FIG. 5 comprises a series of discreet tray panels which are contigiously joined to form the tray contacting member. For ease of description in the following discussion, the discreet tray panels of the tray contacting member have each been separately numbered. The first band portion of the tray member in this embodiment comprises discrete panels 543 c–h. The angular orientation of slot openings in the first tray band portion is uniform in all constituent panels, at a value of 75° . The slotting density is uniform, with a ratio of the total area of the slot openings therein to the total active area of the first band portion of 0.02. The third band portion, comprising the constituent panels 544 a–c and 544 e–g, extending from the downstream extremity of the first band portion to the tray transverse center line c—c at the liquid discharge, as well as the central panel 544d extending from the bubble promoter 514 downstream to the tray transverse center line c—c, all have a 0 slot density, i.e., are unslotted. The perforation density of the fixed size perforation openings is uniform across the entire active area of the tray contacting area, and has a value of 0.124 sq. ft. total area of perforation openings per sq. ft. of active area of the tray contacting member.

It is frequently not desirable to employ high slot angles in the regions adjacent the transvers periphery of the tray contacting member, since such high slotting may direct liquid to adjacent the column wall and lead to channeling adjacent to column wall surfaces and lowered efficiency for the tray. On the FIG. 5 tray, the moderate angle slotting panels 543a, b, i and j serve to spread the inlet liquid uniformly over the full width of the tray, in conjunction with the high angle slotting panels 543 c–h.

The first band portion in the FIG. 5 embodiment comprises two discreet band segments each disposed adjacent to the liquid inlet region, transversely spaced apart from one another and symetrically aligned with respect to the tray diametral streamline d—d. In this arrangement, wherein the first band portion comprises two discreet band segments, the respective segments should be spaced apart from one another by distance no more than 50% of the transverse length of the liquid inlet surface at its downstream edge. The purpose of such constraint is avoid preferential channeling of liquid from the liquid inlet to the liquid discharge in the vicinity of the tray diametral stream line, such as would cause liquid maldistribution problems on the tray.

Figure 6:
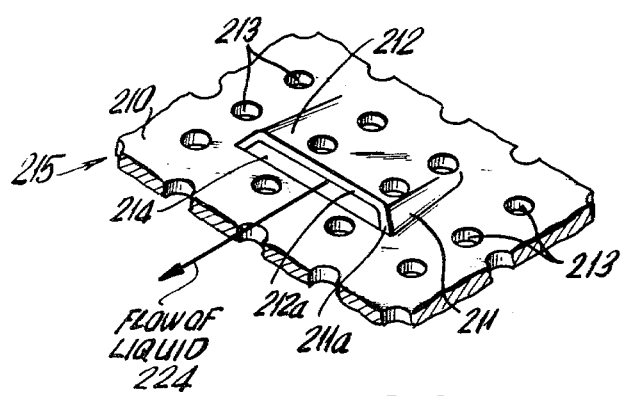
FIG. 6 is an isometric view of a portion of an exemplary gas-liquid contacting member of a slotted sieve tray, showing the relationship between fixed size openings with walls normal to the tray contacting member surface, and a slot with side walls forming acute angles with the tray contacting member main flat top surface.

FIG. 6 is an isometric view of a portion of a gas-liquid contacting surface, showing the relationship between fixed size openings with walls normal to the tray surface, and slots having side walls forming obtuse angles with the tray member main flat top surface exterior to the slot enclosure. This is a preferred slot opening construction which may be used to form variable slot density and slot angle trays such as may be advantageously employed in conjunction with the present invention. Situated on main flat surface 210 are a number of fixed size openings or perforations 213 normal to surface 210 and extending through the tray member 215. Also on the main flat surface 210 are a number of elevated portions formed from the tray member having a top space surface 212 inclined to the main flat surface 210 and integral therewith. These elevated portions have sides 211 which are also inclined to the main flat surface 210 and integral therewith. The top surface 212 and the inclined sides 211 having leading edges 212a and 211a respectively above the main flat surface 210. The flat surface just below leading edge 212a and the leading edge 211a of inclined sides 211 are situated such that they form an aperture or slot 214 having an aperture plane which may be normal to the main flat surface 210 or slightly inclined thereto, depending upon the manner in which the elevated portions are initially formed.

In operation, a process vapor or gas flows only through perforations 213 and slot 214. A portion of the vapor passes through the perforations 213 normal to the tray surface 210 and proceeds through the process liquid contained on the tray and forms bubbles while passing through the process liquid.

In this manner intimate contact between liquid and vapor is achieved. The vapor passing through slot 214 does not leave the surface of the tray normal thereto as does vapor passing through perforations 213. Instead, the vapor impinges on the lower side of slot top surface 212 and is directed obliquely into the process liquid. In this manner the under side surface acts as a gas flow directing surface. It should also be noted that the slot opening 214 functions as a throat, i.e., it converts pressure drop to kinetic energy. The kinetic energy or vapor thrust associated with this portion of the vapor is at an angle to the tray surface 210. This inclined vector may then be resolved onto its horizontal and vertical components. The horizontal component is directed into and absorbed by the process liquid thereby causing the process liquid to flow in the direction 224.

The sizes of perforation 213 and slot 214 depend on the flow requirement for a particular liquid-gas contacting system, as will be understood by those skilled in the distillation art. For example, perforation diameter of 0.015 to 0.125 inch are satisfactory for air separation applications, but larger diameters up to about 0.25 inch may be preferred for other gas-liquid systems. The perforations are most conveniently formed by punching holes through a metal sheet, and for mechanical reasons sheet metal cannot be thicker than the punched hole diameter. Perforations of diameter smaller than 0.015 inch will generally necessitate the use of a tray material which is too thin to provide level support for the liquid. On the other hand, if the perforations are excessively large in diameter, normally desirable pressure drops would be insufficient to keep the tray from weeping, thereby reducing tray efficiency. Although the perforations 213 need not be of circular cross-section, this configuration is preferred from standpoints of manufacturing ease.

The invention will be more fully understood by the following examples:

EXAMPLE 1

In this example, a two-pass, side-to-center flow slotted sieve tray of the general type shown in FIG. 5 herein was evaluated with a bubble promoter constructed in accordance with the present invention and with a bubble promoter constructed in accordance with the teachings of Bruckert et al, U.S. Pat. No. 3,282,576. The further description of the test apparatus will be by reference to the FIG. 5 tray embodiment. In all tests the tray had a diameter of 20 ft. as measured along the tray transverse center line. The length of the inlet surface 500 at its downstream edge adjacent the bubble promoter was 14.7 ft., corresponding to a tray surface area for the liquid inlet surface of 24.0 sq. ft. In all cases, the bubble promoter had a length measured from its upstream to its downstream edge in the plane of the tray of 8.1 inches and a height of 0.5 inch. The height for the Bruckert et al bubble promoter, hereinafter denoted "ramp promoter," was measured in a vertical plane to the uppermost edge of the downwardly sloping promoter wall member. The height of the promoter constructed in accordance with the present invention, hereinafter denoted "box promoter," was the measured height of the second imperforate wall member, each of which was of the same height. The unslotted panels 542 a-d each had a length, as measured in the direction parallel to the tray diametral streamline d—d, of 4.2 inches, and a width, as measured in a direction transverse to the tray diametral streamline d—d and parallel to the tray transverse center line c—c, of 21 inches. As referred to hereinafter, all length dimensions of the constituent tray panels will be similarly taken as meaning the dimension parallel to the tray diametral streamline d—d and the width of each of the constituent panels will be taken as the dimension of the panel parallel to the tray transverse center line c—c.

Each of the peripheral tray panels 543a and 543j of the second band portion of the tray contacting member had a length measured along its interior edge of 34.5 inches and a width measured along the tray transverse center line c—c of 5.1 inches. The perforation density for these tray panels, as for all panels of the tray contacting member, was substantially 0.124 sq. ft. of open area per sq. ft. of contacting member surface area. All slots on the tray had a slot opening width of 0.5 inch and a length measured from the front leading edge of the slot adjacent to the slot opening to the rear-most edge of the slot integral with the main flat top surface of the tray contacting member of 0.5 inch. Second band portion panels 543a and 543j each had 24 transversely extending rows of slots uniformly spaced apart on its surface from the upstream edge to the downstream edge thereof. Each row contained 5 slots, with a transverse spacing between adjacent slots of approximately 0.65 inch and a longitudinal spacing between adjacent rows of approximately 1 inch. The second band portion panels 543b and 543i were each 71.7 inches in length as measured at their inner length edges, and each had a width of 21 inches. These panels each contained 48 transversely extending rows of slots uniformly spaced along the length thereof, each row containing 16 slots spaced transversely apart at a distance of approximately 0.75 inch and with a longitudinal spacing between adjacent rows of approximately 1.2 inches.

The first band portion panels 543c and 543h were each 38 inches in length and 21 inches in width, and had 15 longitudinal extending rows of slots uniformly spaced across the width of the panel at a distance of approximately 1.0 inch between adjacent rows. Each row consisted of three segments, each having 10 slots longitudinally spaced apart at a distance of approximately 0.63 inch and with a longitudinal spacing of approximately 2.5 inches between adjacent row segments. Each of the first band portion panels 543d, e, f and g was 24.9 inches in length and 21 inches in width. Each of these panels had 15 longitudinally extending rows of slots uniformly spaced apart across the width thereof at a spacing of approximately 1.0 inch between adjacent rows. Each of the rows consisted of two row segments each segment comprising 10 slots longitudinally spaced apart at a distance of 0.63 inch and with a longitudinal spacing between the adjacet row segments of approximately 2.5 inches. The third band portion comprising panels 544a–g was unslotted, i.e., its open area consisted solely of fixed perforation openings uniformly distributed across the surface thereof at a perforation density of 0.124.

In the comparative evaluation testing of the prior art ramp promoter and the box promoter of this invention, three distinct slotting configurations for the gas-liquid contacting member were employed, as hereinafter respectively designated as configurations A, B and C. Each of these slot configurations is based on the gas-liquid contacting member arrangement described above. In configuration A, the first five rows of slots from the edge of the panel nearest the tray diametral streamline d—d were blanked off on panels 543d, e, f and g. In configuration B, the arrangement of configuration A was modified by blanking off 80% of the slots on the tray panels while preserving a uniform slotting pattern; this modification lowered the slot density for the modified panels to 0.004. In configuration C, configuration A was modified by blanking off 60% of the slot on the panels while preserving a uniform slotting pattern, thereby reducing the slot density for the panels to 0.008.

The above-described tray configurations were tested, using the prior art ramp bubble promoter and the box promoter of the present invention in an air-water gas-liquid containing column operated at 100% loading, corresponding to an active are gas velocity of 7.5 ft. per second, and a liquid loading of 0.105 cu. ft. per second per foot of liquid outlet weir length. Air was supplied to the air-water contacting column by a 600 horsepower blower with capacity of 131,000 actual cu. ft. per minute and 14.3 inch water static discharge pressure. A recirculating water system was provided with a capacity of 2500 gals. per minute (gpm). A means was provided for injecting a distinct line of dye into the liquid at the tray inlet and viewing windows were provided in the column wall for determining fluid flow profiles and maximum and minimum residence times on the tray configurations tested. During the tests, runs were made with the bubble promoters having perforation densities approximately equal to the open area density of the gas-liquid contacting surface (0% blanking) and in the remainder of the runs the perforations in the bubble promoter surfaces were blanked to yield a promoter perforation density of about 50% of the tray open area density (50% blanking). Observationally, the box promoter of this invention performed more effectively at the 50% blanking level. As previously indicated, the fractional open area of the intermediate wall member of the bubble promoter of this invention should be from 20 to 125% of the fractional open area of the gas-liquid contact member, and preferably from 35 to 100% of the fractional open area of the gas liquid contact member. The results of the comparative tests are shown below in Table I and include the maximum and minimum liquid residence times measured for the respective tray configurations, as well as the ratio of the maximum to minimum residence times for the tray.

TABLE I

Hydraulic Performance Evaluation of Ramp and Box Bubble Promoters Employed on Two-Pass, Side-to-Center Flow Slotted Sieve Trays

| Case | Tray Configuration | Promoter Type | Promoter Blanked Perforation Area, % | Liquid Residence Time Maximum Sec. | Minimum Sec. | Ratio, Maximum to Minimum |
|---|---|---|---|---|---|---|
| 1 | B | Ramp | 50 | 6.0 | 3.0 | 2.0 |
|   | B | Box | 50 | 8.5 | 4.25 | 2.0 |
| 2 | A | Ramp | 0 | 5.0 | 3.25 | 1.54 |
|   | B | Box | 0 | 9.0 | 3.75 | 2.40 |
| 3 | B | Ramp | 50 | 6.0 | 3.0 | 2.0 |
|   | C | Box | 50 | 7.0 | 3.5 | 2.0 |

Such residence time ratios provide a good quantitative measure of the uniformity of fluid flow distribution on the tray contacting member surface. The residence time ratio which is required for good hydraulic behavior, i.e., close approach to plug flow, on the tray surface has been determined to be in the range of from about 1.0 to 2.0.

As shown by the data tabulated in Table 1, a significant improvement is achieved with the box promoter of this invention by increase in the minimum residence time of the liquid flowing across the tray relative to the tray configurations employing the ramp bubble promoter of the prior art. An increase in the minimum residence time of at least 15 percent was achieved by the tray configurations employing the box promoter of the present invention relative to the tray configurations employing the ramp promoter of the prior art. The desired average residence time for liquid on the various tray configurations is about five seconds at the loading conditions employed, a level which is more closely approached by the tray configurations employing the box promoter than by the tray configurations employing the ramp promoter. Furthermore, the desired increase in minimum liquid residence time was achieved by the tray configurations employing the box promoter without adversely increasing the residence time ratio (maximum residence time/minimum time) beyond desirable ratio values.

In assessing the meaning of the results presented in case 2, it is to be recognized that, due to the difference in tray configuration between the run employing the ramp promoter and the run employing the box promoter, any improvement afforded by the latter could be masked by the change in the slot pattern on the tray surface. The slot density of the tray used in conjunction with the box promoter was less than the slot density of the tray used with ramp promoter; it is to be expected, therefore, that the vapor thrust propelling the liquid across the tray would be lower with the box promoter than with the prior art promoter.

On the other hand, case 3 particularly demonstrates the improvement afforded by the box promoter of this invention relative to the prior art ramp bubble promoter. Here again, there was a difference in the tray configuration in the runs for the respective promoters, with the ramp promoter being utilized in connection with tray configuration B and the box promoter being employed in connection tray configuration C. In considering the respective tray configurations, one would expect that the change in the slot pattern from the tray equipped with the ramp promoter to the tray equipped with the box promoter would have the effect of decreasing, to some extent, the residence time of the liquid on the tray, since the tray with the box promoter had a higher slot density than the tray with the ramp promoter. Surprisingly, however, the use of the box promoter negated this expected effect, resulting instead in an increase in the residence times on the tray, while concurrently maintaining the same residence time ratio of 2.0 as the tray using the ramp promoter.

As indicated earlier herein, the bubble promoter of this invention is particularly useful on two-pass sieve trays of the type shown in FIG. 5 employing high angled slots at the inlet region of the tray, as disclosed and claimed in U.S. Ser. No. 772,941. In general, center downcomer two-pass sieve trays, particularly when of large diameter, are characterized by a problem of liquid maldistribution at the inlet region of the tray, as associated with the diverging liquid flow path at that region of the tray. On such trays, liquid flowing onto the gas-liquid contacting member from the inlet surface tends to preferentially flow down the tray's center line, rendering the tray perimetral areas stagnant or semi-stagnant. By employing the high angle inlet slotting configuration which is the subject of our aforementioned Ser. No. 772,941, an improved liquid distribution on the tray surface was achieved. However, further testing indicated that the liquid introduced to the tray still moved across the tray surface too rapidly for highly efficient gas-liquid contact. This problem was particularly encountered when the prior art ramp promoter was used as the bubbling initiation means on the center downcomer tray. However, the gas-liquid contacting efficiency of the center downcomer tray employing high angled slots at its inlet region was significantly improved by employment of the bubble promoter of the present invention on the tray, as is indicated by the data shown in Table I.

Another hydraulic problem observed on two-pass trays, particularly those of the center downcomer type, was a high spray height just downstream of the ramp promoter. As previously discussed, this spraying significantly reduces tray efficiency, and normally is only mitigated by the costly remedy of increasing tray spacing in the distillation column. It has been found, however, that in addition to providing improved liquid residence time behavior on the tray, the bubble promoter of the present invention substantially eliminates such inlet spraying.

EXAMPLE 2

Figure 7:
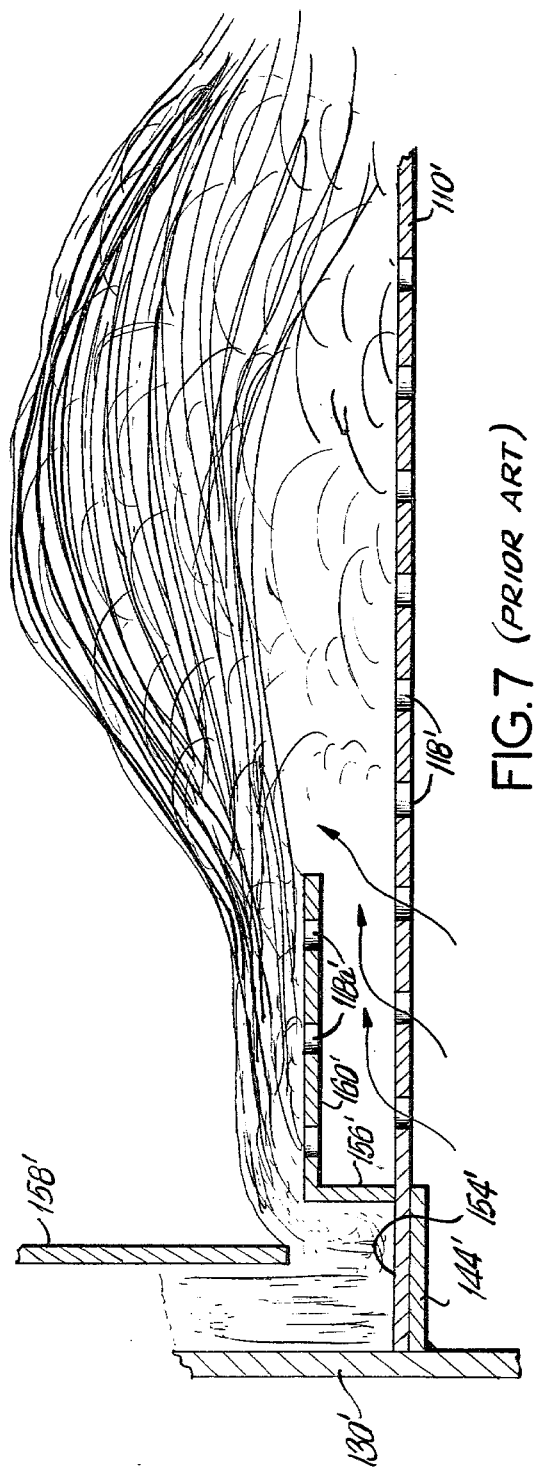
FIG. 7 is a cross sectional elevational view of a sieve tray constructed in accordance with the prior art, featuring a bubble promoter with a horizontally extending perforated plate member, showing observed hydraulic behavior thereon.
Figure 8:
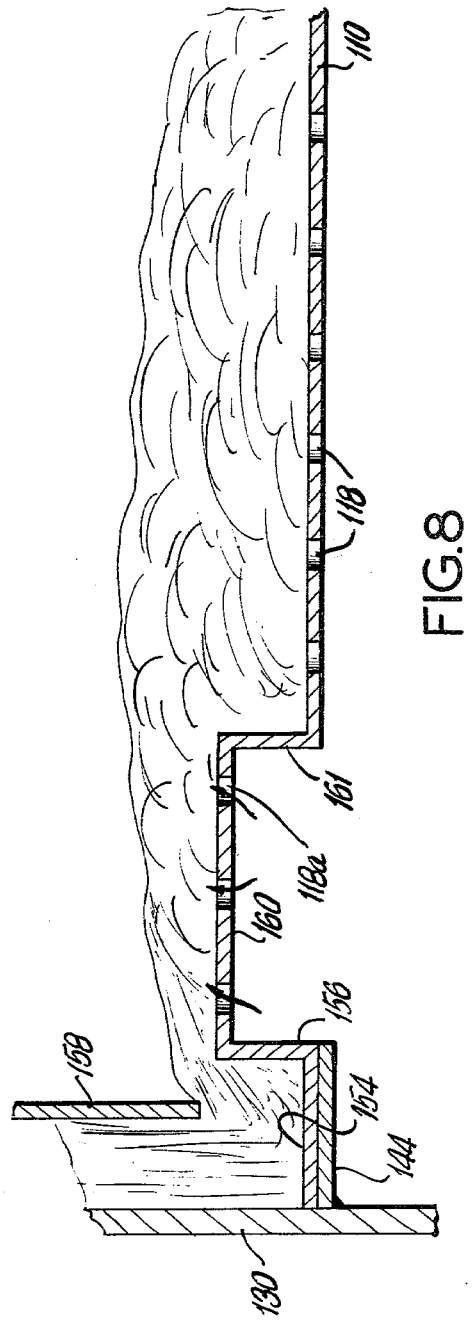
FIG. 8 is a cross sectional elevational view of a sieve tray constructed in accordance with the present invention and operating under the same process conditions as the prior art tray of FIG. 7, showing the observed hydraulic behavior thereon.

In this example, a performance comparison was made between a tray constructed in accordance with the present invention and a tray constructed in accordance with the prior art, with the latter utilizing a bubble promoter of the type described in an earlier section herein with a horizontally extended plate overlying the gas-liquid contacting member and terminating at its downstream edge above the contacting member to form an opening bounded by the horizontal plate member downstream edge and the top main surface of the contacting member immediately beneath the downstream edge of the horizontal plate member; this prior art bubble promoter will hereinafter be denoted as the "open plate promoter." FIGS. 7 and 8 herein are cross-sectional elevational views of a prior art tray employing the open plate promoter and a tray constructed in accordance with the present invention, respectively. These drawings show the hydraulic gas-liquid behavior on the respective trays, an observed during actual experimental testing of the tray configurations illustrated. In this experimental testing, tray sections were tested which were 2 feet in length, as measured along the liquid flow path, and with a width of 1 foot. The gas-liquid contacting members 110, 110' had circular cross-section perforations approximately 0.188 inch in diameter uniformly distributed across the surface thereof, with the perforated area representing approximately 11 percent of the total tray area of the gas-liquid contacting member. The height of the imperforate vertical wall member 156' of the open plate promoter shown in FIG. 7 was 1 inch. The height of the first imperforate wall member 156 in the promoter of FIG. 8 was also 1 inch. Dimensional equivalence was also maintained for the horizontal plate members of the respective bubble promoters; the length of the horizontally extending plate 160' of the open plate promoter in FIG. 7, as measured from the upstream to the downstream edge thereof, and the length of the intermediate wall member 160 of the bubble promoter shown in FIG. 8 as measured from the upstream to the downstream edge thereof, were each 4 inches. The froth profile in FIG. 8 and the spray and froth profile in FIG. 7 represent operation at loadings corresponding to an active area gas velocity of 2.9 to 5.8 feet per second and a liquid loading of from 0.1 to 0.2 cubic feet per second per foot of outlet weir length. The arrows in the FIG. 7 drawing illustrate the flow path of the process vapor through the perforations 118' in the gas-liquid contacting member 110' which gave rise to the downstream spray behavior of the water and air phases together with a substantial non-uniformity of the froth height across the surface of the tray. A comparison with FIG. 8 shows that in the latter case substantially uniform froth height was achieved across the gas-liquid contacting member 110 of the tray, together with virtual elimination of the spraying characteristic of the prior art open plate promoter. The latter achievement of the bubble promoter of this invention, in reducing the spray height associated with the prior art promoter, represents a substantial advantage for the promoter of this invention. At a given loading level on the distillation tray, a reduction of the spray height permits closer tray spacing in the column with resulting reduction in the overall size of the column and in the associated capital cost for the separation apparatus; alternatively, if the spacing between adjacent trays in the distillation column is maintained at a constant value, the reduction of spray height permits a higher gas-liquid contacting tray efficiency to be maintained by virtue of reduced entrainment for the contacting tray.

In conventional practice, the hydraulic behavior shown in FIG. 7 for the prior art open plate promoter has been commonly accepted and even regarded as being of a beneficial character, for the reason that not only is inlet activity insured, but that a high "froth" height is also provided. It is to be recognized, however, that the upper part of the inlet region froth regime produced by the open plate promoter is in fact a spray, and that a high spray height is not synonymous with a high froth height. For efficient gas-liquid contacting operation, a high depth of true froth should be uniformly maintained over the entire active tray surface. Such maintenance of uniformly high froth height on the tray maximizes the gas-liquid contact time and avoids areas of non-uniformity which are prone to result in liquid entrainment and weeping. To illustrate the magnitude and adverse effect of froth height nonuniformity on gas-liquid contacting efficiency and entrainment, general hydraulic and mass transfer calculations were made which show that, with all other parameters being equal:

(1) a gas-liquid contacting tray having a 90 percent contacting efficiency at a gas velocity of 5 feet/second and 6-inch froth height will lose about 4 percent of its efficiency if over acceleration of the froth by the promoter reduces the froth height by 1 inch from 6 inches to a froth height of 5 inches;

(2) a tray with a uniform average froth height of 6 inches, a gas velocity of 5 feet per second and a point efficiency of 90 percent will have a 3 percent higher contacting efficiency than a tray with a non-uniform froth height, wherein the non-uniform froth height is characterized by one-half of the tray having a froth height 25 percent above the average froth height together with a vapor velocity 25 percent below the average vapor velocity, the other tray half having a froth height 25 percent below the average froth height together with a vapor velocity 25 percent above the average vapor velocity; and (3) in addition to the loss of efficiency in (2) due to non-uniform gas-liquid contacting, entrainment will be higher on the tray with the two regions of different froth heights, than on the tray with a uniform froth height, even though the average froth height will be the same in both cases. Entrainment recycles already distilled liquid up to the previous overlying tray, rather than to the next lower tray, as is desired. An entrainment level of 5 pounds of liquid recycled per 100 pounds of liquid flowing across the tray will cause a 5 percent reduction in tray efficiency. To reduce the entrainment level on a tray having a non-uniform froth height to the same value as on a tray having an uniform froth height requires an increase in tray spacing nearly equal to the difference between the maximum forth heights on the respective trays. In a column containing a larger number of trays, only a small increase in inter-tray spacing results in a large increment in capital equipment costs.

The foregoing general calculations show the substantial advantage of the bubble promoter of the present invention relative to the bubble promoters of the prior art, with respect to gas-liquid contacting efficiency and minimization of entrainment of liquid in the upflowing process vapor.

In connection with the foregoing discussion, a comparison was made between a gas-liquid contacting tray employing an open plate bubble promoter of the prior art and a gas-liquid contacting tray constructed in accordance with the present invention. The comparison was based on cross-flow sieve trays each 8 feet in diameter with an 80 percent active area. The promoters on the respective trays each had a height of 1 inch and a length of 4.0 inches. Spacing between adjacent trays in the gas-liquid contacting column was 15 inches and the average tray open area was 13.3 percent. Each of the trays operated under the same proprocess conditions. The active area vapor velocity across the contacting trays was 8.6 feet per second. The volumetric liquid flow through the system was 1.2 cubic feet per second, with a loading on the contacting trays of 0.2 cubic feet per second per foot of length of the outlet weir. The density of gas was 0.075 pounds per cubic foot and the density of process liquid was 62.4 pounds per cubic foot. The hydraulic residence time profiles on each tray was assumed to be similar and the hydraulic behavior on the respective trays was assumed to be substantially as shown in FIGS. 7 and 8 herein. Under these conditions the tray employing the bubble promoter of the present invention provided a uniform froth height of 9 inches across the contacting tray, with no evidence of a spray regime. The prior art tray employing an open plate bubble promoter correspondingly had an inlet spray regime which was 1.5 feet in length, longitudinally across the tray from the vertical wall 156 feet, with a 12 inch average "froth" height; the remainder of the tray surface had a 8.5 inch froth height. For comparative purposes, the efficiency of the tray constructured in accordance with the present invention, having a uniform 9 inch froth height thereon, and essentially no entrainment, was taken to be 90 percent. It was further assumed that in this gas-liquid contacting system, a spray regime was 50 percent as effective as a normal froth.

Based on the foregoing, average tray pressure drops were calculated for each of the trays. The average tray pressure drop for the prior art tray employing an open plate promoter was 2.57 inches of water, while the average tray pressure drop for the tray constructed in accordance with the present invention was 2.85 inches of water. One would expect that the relative magnitudes of these average tray pressure drops would be reversed, since in general the higher the froth level on a tray the higher is the pressure drop associated therewith, and the prior art tray employing an open plate promoter has a higher average "froth" height. However, as is shown in FIG. 7, the "froth" on the tray surface immediately downstream from the open plate bubble promoter comprises a significant amount of spray, which gives rise to a lower pressure drop relative to a more or less homogeneous gas-liquid matrix such as is provided on the surface of the tray constructed in accordance with the present invention. As also calculated based on the foregoing, the tray with the open plate promoter of the prior art exhibits an entrainment level of 14.7 percent, 13 percent of which is attributable to the inlet region spray regime and 1.7 percent of which derives from the remaining tray surface. By contrast, the tray constructed in accordance with the present invention exhibits a greatly reduced entrainment level of only about 3.2 percent. This level of 3.2 percent entrainment had the effect of reducing the efficiency of the gas-liquid contacting tray constructed in accordance with the present invention from the initially assumed value of 90 percent to a value of 87.5 percent. By contrast, the gas-liquid contacting efficiency of the prior art tray using an open plate bubble promoter, based on the aforementioned level of entrainment of 14.7 percent, was only 77.5 percent. Thus, relative to the tray employing the open plate promoter of the prior art, the tray constructed in accordance with the present invention showed a 13 percent improvement in gas-liquid contacting efficiency. Such increase in contacting efficiency illustrates the substantial benefit achieved by the contacting tray constructed in accordance with the invention from the provision of a substantially uniform froth height across the gas-liquid contacting surface, together with minimization of spraying at the inlet region of the tray.

Although preferred embodiments of this invention have been described in detail, it is contemplated that modification of the apparatus may be made and some features may be employed without others, all within the spirit of the invention.

What is claimed is:

1. In a gas-liquid contacting tray of the double-pass, side-to-center flow slotted sieve-type for use in a distillation column to effect intimate contact between rising vapor and liquid flowing across a gas-liquid contacting member of the tray having main flat top and bottom surfaces from a liquid inlet adjacent one edge of the contacting member along a liquid flow path on said main top surface including a diverging flow section adjacent said inlet to a liquid discharge adjacent an opposite edge of said contacting member extending transversely from edge to edge of said tray along the tray transverse centerline, said liquid inlet including a substantially horizontally aligned imperforate inlet surface for receiving liquid extending transversely and parallelly oriented with respect to said liquid discharge, and in liquid flow communication with said contacting member, with a downcomer member adapted to be positioned substantially parallel to the distillation column inner wall, spaced above and coextensive with said inlet surface so as to form an exit path beneath the lower end of said downcomer member for introducing liquid to said inlet surface, with a plurality of fixed sized openings distributed across the contacting member and extending therethrough with walls normal to said main flat top and bottom surfaces for gas flow, and a plurality of elevated portions formed from said member across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, the improvement comprising:

a first band portion of said contacting member adjacent to said liquid inlet and extending therefrom downstream for distance of from 20% to 50% of the length of the tray diametral streamline from said liquid inlet surface to said liquid discharge and extending transversely outwardly from the tray diametral streamline for distance at least 25% of the transverse length of said liquid inlet surface, with angular orientation of slot openings in said contacting member first band portion with respect to and away from the tray diametral streamline such that the slot angle of individual slots is greater than the angle formed by the diametral streamline and a tangent line at the contacting member outer edge at the point of intersection with said liquid inlet surface, said first band portion being bounded at each of its transverse outer extremities by adjacent second band portions of said contacting member each extending transversely to the contacting member outer edge and downstream to said liquid discharge, said second band portions having angular orientation of slot openings therein with respect to and away from the tray diametral streamline such that the slot angle of individual slots is between 15° and 45°, and said first band portion being bounded at its downstream extremity by an adjacent third band portion of said tray member extending transversely between said second band portions and downstream from said first band portion to said liquid discharge, said third band portion having lower slot density than said first and second band portions;

a first imperforate wall member contiguously associated and coextensive with an edge of said inlet surface transverse to the liquid flow path and extending substantially vertically upwardly from such edge to a substantially uniform height;

an intermediate wall member with main flat top and bottom surfaces contiguously associated and coextensive with the upper edge of said first wall member extending horizontally therefrom in the direction of said liquid discharge to a substantially uniform extent, with a plurality of fixed size openings uniformly distributed across said intermediate wall member and extending therethrough with walls normal to said main flat top and bottom surfaces for gas flow, to initiate bubbling in liquid flowing across said intermediate wall member from said inlet surface over said first imperforate wall member; and a second imperforate wall member contiguously associated and coextensive at its upper edge with the downstream edge of said intermediate wall member and extending substantially vertically downwardly therefrom and contiguously associated and coextensive at its lower edge with said one edge of said contacting member, whereby liquid which has been flowed across said intermediate wall member and in which bubbling has been initiated is introduced to said gas-liquid contacting member for flow thereacross to said liquid discharge.

2. In a gas-liquid contacting tray of the double-pass, side-to-center flow slotted sieve-type for use in a distillation column to effect intimate contact between rising vapor and liquid flowing across a gas-liquid contacting member of the tray having main flat top and bottom surfaces from a liquid inlet adjacent one edge of the contacting member along a liquid flow path on said main top surface including a diverging flow section adjacent said inlet to a liquid discharge adjacent an opposite edge of said contacting member extending transversely from edge to edge of said tray along the tray transverse centerline, said liquid inlet including a substantially horizontally aligned imperforate inlet surface for receiving liquid extending transversely and parallelly oriented with respect to said liquid discharge, and in liquid flow communication with said contacting member, with a downcomer member adapted to be positioned substantially parallel to the distillation column inner wall, spaced above and coextensive with said inlet surface so as to form an exit path beneath the lower end of said downcomer member for introducing liquid to said inlet surface, with a plurality of fixed sized openings distributed across the contacting member and extending therethrough with walls normal to said main flat top and bottom surfaces for gas flow, and a plurality of elevated portions formed from said member across said surfaces each with an upper surface raised from said main flat top surface having a front leading edge separated from said main flat top surface to form an elongated slot opening therewith of greater width than height, the raised upper surface being inclined to said main flat top surface and having a back edge integral with such surface and each elevated portion being spaced from adjacent elevated portions by said main flat top surface entirely surrounding such elevated portion, the improvement comprising:

a first band portion of said contacting member adjacent to said liquid inlet and extending therefrom downstream for distance of from 20% to 50% of the length of the tray diametral streamline from said liquid inlet surface to said liquid discharge and extending transversely outwardly from the tray diametral streamline for distance at least 25% of the transverse length of said liquid inlet surface, with angular orientation of slot openings in said contacting member first band portion with respect to and away from the tray diametral streamline such that the slot angle of individual slots is between 75° and 90° and greater than the angle formed by the diametral streamline and a tangent line at the contacting member outer edge at the point of intersection with said liquid inlet surface, said first band portion being bounded at each of its transverse outer extremities by adjacent second band portions of said contacting member each extending transversely to the contacting member outer edge and downstream to said liquid discharge, said second band portions having angular orientation of slot openings therein with respect to and away from the tray diametral streamline such that the slot angle of individual slots is between 15° and 45°, and said first band portion being bounded at its downstream extremity by an adjacent third band portion of said tray member extending transversely between said second band portions and downstream from said first band portion to said liquid discharge, said third band portion having lower slot density than said first and second band portions;

a first imperforate wall member contiguously associated and coextensive with an edge of said inlet surface transverse to the liquid flow path and extending substantially vertically upwardly from such edge to a substantially uniform height;

an intermediate wall member with main flat top and bottom surfaces contiguously associated and coextensive with the upper edge of said first wall member extending horizontally therefrom in the direction of said liquid discharge to a substantially uniform extent, with a plurality of fixed size openings uniformly distributed across said intermediate wall member and extending therethrough with walls normal to said main flat top and bottom surfaces for gas flow, to initiate bubbling in liquid flowing across said intermediate wall member from said inlet surface over said first imperforate wall member; and a second imperforate wall member contiguously associated and coextensive at its upper edge with the downstream edge of said intermediate wall member and extending substantially vertically downwardly therefrom and contiguously associated and coextensive at its lower edge with said one edge of said contacting member, whereby liquid which has been flowed across said intermediate wall member and in which bubbling has been initiated is introduced to said gas-liquid contacting member for flow thereacross to said liquid discharge.

* * * * *